HENRY B. FERGUSON
JAMES J. ROARK INVENTORS

BY John D. Gassett
ATTORNEY

HENRY B. FERGUSON
JAMES J. ROARK  INVENTORS

Jan. 18, 1966 J. J. ROARK ETAL 3,230,541
SYSTEM FOR ANALYSIS OF SEISMIC SIGNALS
Filed Jan. 3, 1962 4 Sheets-Sheet 3

HENRY B. FERGUSON
JAMES J. ROARK INVENTORS

BY John D. Gassett
ATTORNEY

Jan. 18, 1966   J. J. ROARK ETAL   3,230,541
SYSTEM FOR ANALYSIS OF SEISMIC SIGNALS
Filed Jan. 3, 1962   4 Sheets-Sheet 4

HENRY B. FERGUSON
JAMES J. ROARK   INVENTORS

BY John D. Gassett

ATTORNEY

United States Patent Office 3,230,541
Patented Jan. 18, 1966

3,230,541
SYSTEM FOR ANALYSIS OF SEISMIC SIGNALS
James J. Roark, Tulsa, Okla., and Henry B. Ferguson, Sudbury, Mass., assignors to Jersey Production Research Company, a corporation of Delaware
Filed Jan. 3, 1962, Ser. No. 164,105
4 Claims. (Cl. 346—1)

The present invention relates to a system for processing seismic information and more particularly relates to an improved system for analyzing seismic data for subsequent interpretation. In still greater particularity, the present invention provides a system for detecting the occurrences of seismic wavelets.

The use of seismic methods of prospecting for subterranean deposits of minerals such as petroleum deposits is widespread. In essence, such methods generally include generating a seismic shock at the earth's surface under such conditions that an elastic impulse or seismic wavelet is transmitted downwardly into the earth. Generally, the impulse or down-traveling wavelet is produced by the detonation of a high explosive charge in a shot hole drilled in the surface of the earth. However, other methods such as weight dropping or air shooting, for example, are also used. When a down-traveling wavelet thus generated encounters strata or other substrata discontinuities, a portion of the energy in the wavelet is reflected back toward the earth's surface. The reflected wavelet reaching the surface is picked up by one or more seismic transducers, commonly called geophones, at positions and locations spaced from the point where the seismic shock wave was initially generated. The geophones convert the wave motion into electrical energy. Each seismic detector generally receives a number of refracted or reflected wavelets which vary both in magnitude and in arrival time. The variations depend upon the number discontinuities or strata in the subsurface. Due to the many variations in the earth, the electrical energy generated by the geophone usually forms a complex type signal varying in amplitude with time and sometimes having particularly prominent variations in amplitude at times corresponding to the arrival of reflected waves. However, in many seismic signals the reflected wavelet is more or less obscured within a complex type signal.

Much useful information concerning the nature and depth of subsurface formations can be obtained by noting the time at which a seismic wavelet is initiated and subsequently measuring the time required for the wavelet to be reflected to the seismic geophone from the subsurface discontinuity. To secure this information a seismograph is used to record the moment in which the seismic wavelet was generated and the time when the reflected wavelet reaches the geophone. Normally, such a seismograph records a signal from each geophone or array of geophones in the form of a separate trace on a seismogram. Recently it has been the general practice to record such traces in a reproducible form, such as on magnetic tape. Each trace thus comprises a record of the variations with time and the input of the geophone associated with the trace.

In analyzing seismic information, the records from a a number of geophone locations are displayed in a manner suited for study by an interpreter. One such method is the so-called wiggly trace method in which each seismic signal from a geophone location is displayed as a wiggly-type visible trace. The various traces from the various geophone locations are arranged in a side-by-side relationship and, in effect, form a vertical cross-section of the earth being surveyed. Other types of display which have come into prominent use recently are the so-called variable density presentation and variable color methods. In these systems, the individual seismic signals are produced in a manner such that the greater the intensity of the signal, the greater the density of the record printed. In any event, an interpreter studies the seismogram which has been produced and attempts to detect the points of interest which are indicative of reflections from subsurface change in strata. As the seismic signals are usually rather complex in nature, they are often quite difficult to analyze. It is thus clear that there is a need for improvement in the methods for determining the time of arrival at a geophone of a reflection event from a subsurface stratum. The invention herein discloses such an improved system.

A sharp seismic disturbance, such as an explosion of dynamite, gives rise to a down-traveling wavelet. It has been found that the seismic reflection event or reflection wavelet propagates without dispersion. This characteristic results in a linear phase-frequency curve when a reflection wavelet is subjected to a Fourier frequency analysis. It has further been found that when the slope of the phase-frequency curve is zero, that the center of the interval being analyzed is essentially coincident in time with the center of the wavelet.

Although reference will be made to seismic reflection events or wavelets, the type of analysis to be discussed will apply equally well to the determination of similar discrete events which are propagated without dispersion.

If an impulse, wavelet or packet of energy is transmitted without dispersion, all of the frequency components, which are presumed to contribute to this event, will be traveling in phase at a time corresponding to the center of the event. Since a constant time in the time domain is equivalent to a linear phase-frequency function in the frequency domain, the time difference between any arbitrary time zero and the center of an impulse or wavelet can be determined from the phase-frequency curve derived from a frequency analysis of the impulse or wavelet.

In a preferred manner of operation of this invention, a frequency analysis is performed on successively overlapping short segments or portions of a seismic signal (or trace) at progressive steps along the trace. Each segment is analyzed in a manner to determine the slope of the phase-frequency curve; that is, the slope of a curve that has phase as one axis and frequency as the other axis. A zero slope of the phase-frequency curve indicates that the corresponding interval contains the reflected wavelet and that the center of the segment coincides with the center of the wavelet. Further, a change in slope, of the phase-frequency curve of successive segments, from positive to negative indicates that the last interval analyzed has passed the center of a reflection wavelet or event.

Thus it is one object of the invention to provide an objective method for picking reflection events or reflected wavelets on seismograms.

A better understanding of the invention and other objects will be apparent from the following description taken in conjunction with the drawings in which.

Figure 1:
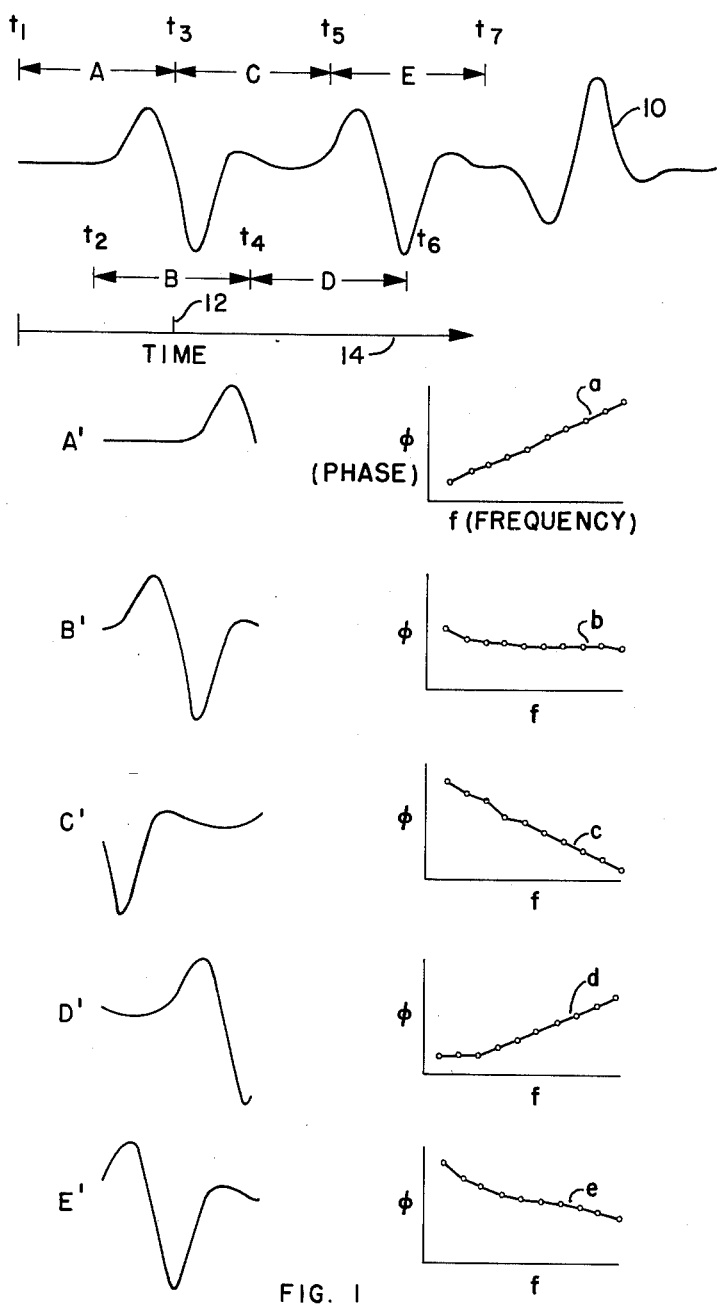
FIG. 1 illustrates phase curves of successive overlapping segments of a selected length of a seimic signal.

For a better understanding of the invention, attention is now directed toward FIG. 1. Illustrated thereon is a portion of a composite seismic signal 10. Seismic signal 10 is divided into overlapping time increments of A, B, C, D and E. The portions or segments of the signal representing such intervals are spaced vertically for convenience and are designated A′, B′, C′, D′ and E′ respectively As illustrated, each segment is of the same duration. As illustrated, segment A is that portion of seismic curve 10 from $t_1$ to $t_3$, B′ is that portion between $t_2$ and $t_4$, C′ is that portion between $t_3$ and $t_5$, D′ is that portion between $t_4$ and $t_6$, and E′ is that portion between $t_5$ and $t_7$.

The time of each segment A′ through E′ is preferably essentially equal to the approximate duration in time of the reflected wavelet, e.g., in this case, about 40 milliseconds. In practice, the exact nature of the reflected wavelet is not known. However, in most cases the duration of the received reflection wavelets may be estimated from the seismogram.

Seismic signal segment A′ is analyzed to obtain its phase-frequency curve $a$, which is illustrated just to the right. Immediately to the right of segments A′, B′, C′, D′, and E′ of the seismic curve 10 are their respective phase-frequency curves $a$, $b$, $c$, $d$, and $e$ respectively. Each such phase curve has frequency for the abscissa and phase for the ordinate. The phase angle values can be obtained by mathematical analysis such as a Fourier analysis. Means are also provided herein and particularly shown in FIG. 2 for determining the phase curves automatically.

FIG. 1 is quite interesting as it illustrates several important features of this invention. When the slope of the phase-frequency curve is zero, then it is known that the increment being analyzed contains the reflected wavelet and the center of the interval coincides with the center of the wavelet. This is particularly illustrated by phase-frequency curve $b$, which is nearly horizontal. The corresponding segment B′ contains the reflected wavelet.

Another interesting feature is also illustrated in FIG. 1. When the phase-frequency curve changes direction from a positive to a negative slope, it is known that the interval being analyzed has passed the center of a reflection event. If only segments A′ and C′ of the seismic curve had been analyzed, one would obtain, of course, phase curve $a$ and $c$. It is readily apparent that the slope of the phase-frequency curve has changed from a positive for $a$ to a negative for $c$. It is thus known that the segments of the seismic signal represented by A′ and C′ contain significant portions of a reflection event and that the center of the event is to the right of the center of the interval for A′ and to the left of the center of the interval for C′. This conclusion is borne out by segment B′ which contains a reflection event and for which the phase-frequency curve $b$ has zero slope. It is interesting to note that all the phase-frequency curves of FIG. 1 are relatively smooth. If a phase-frequency curve is not a relatively smooth curve, the interval being analyzed either contains two or more closely spaced events, which will give rise to discontinuities in the phase-frequency curve; contains a reflection event which is not the dominant feature (i.e., unfavorable signal-to-noise ratio); or contains only noise or dispersed energy.

From the above it can be seen that an entire seismic signal 10, which may have a duration of 4 seconds or more, can be analyzed by this system. The center of each reflection event can be indicated on a time scale placed alongside the seismic curve 10 with an indication mark such as 12. It will, of course, be understood that each trace of a seismic record can be analyzed in this manner and the time axes 14 with indications 12 can be placed in a side-by-side position to give a relative cross-sectional view of the subsurface.

Attention will now be given to the preferred duration of the segment of a seismic signal which is analyzed to determine its phase-frequency curve. The duration of the segment of the seismic curve analyzed, that is from $t_1$ to $t_3$, should preferably be the approximate duration of the reflection wavelet. The next progressive portion analyzed should be for a time which overlaps a portion of the time of the preceding segment. The time $t_2$ in the illustration is conveniently half-way between $t_1$ and $t_3$ of segment A.

However, from a practical point of view, it would be desirable for the trace segment being analyzed to advance in increments of about 2 milliseconds as times picked on a seismic reflection record are usually read to the nearest millisecond. For increments of about 2 milliseconds, the zero-slope could easily be either observed or estimated to the desired precision. If larger increments are used, it would be necessary to compute the time delay (time difference between center of the interval and wavelet center) from the slope of the phase-frequency curve.

Figure 2:
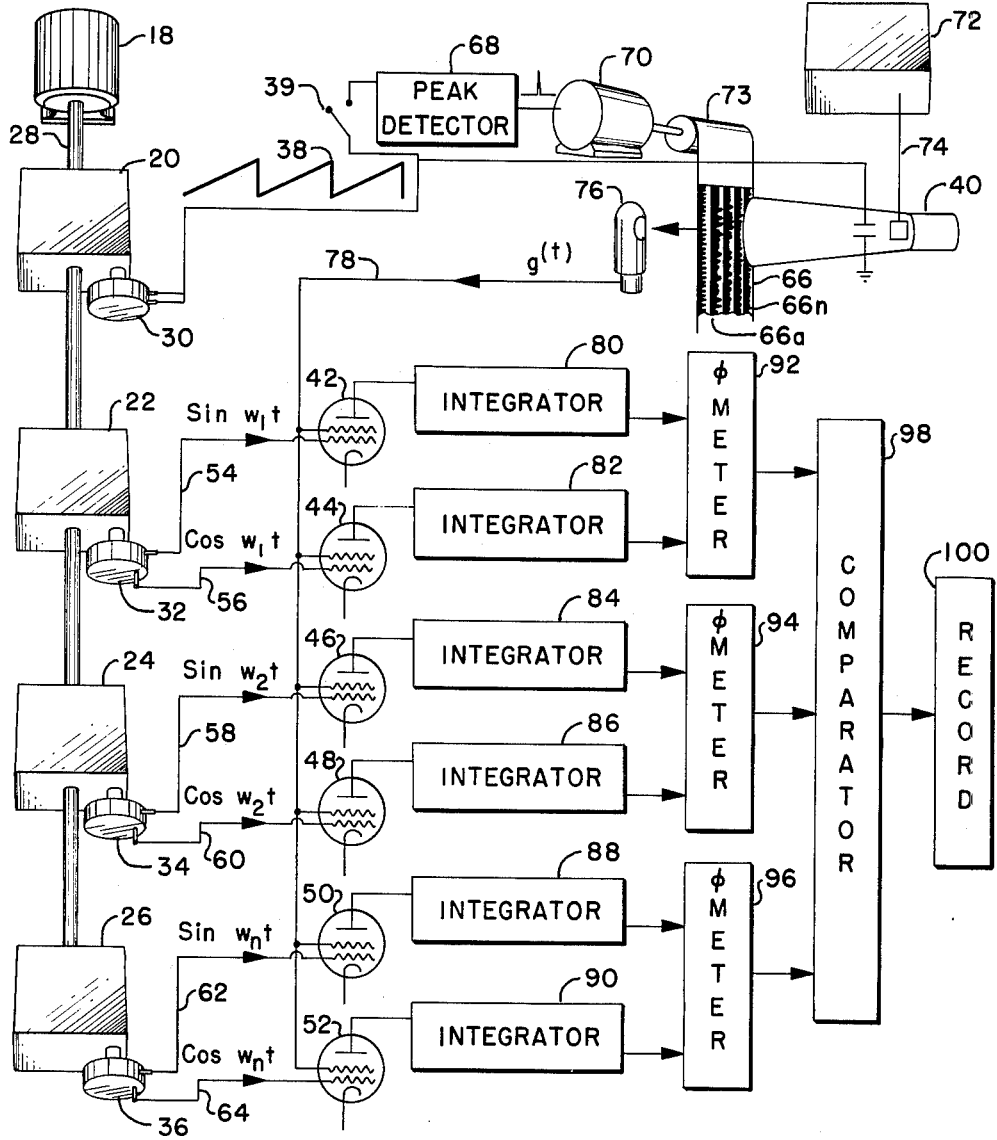
FIG. 2 illustrates an embodiment for carrying out the invention.

Attention will now be directed to FIG. 2 which illustrates a preferred embodiment of one system in which this invention can be carried out. Illustrated thereon is a motor 18 which is connected to gear boxes 20, 22, 24 and 26 by shaft 28. Driven by each gear box 20, 22, 24 and 26 are potentiometers 30, 32, 34 and 36 respectively. Potentiometer 30 is a linear potentiometer, i.e., its output upon uniform rotation, is a sawtooth signal as illustrated at 38. The others are sine potentiometers each of which has a sine component output and a cosine component output. The output from potentiometer 30 is connected to the vertical deflection plate of flying spot scanner 40.

While there are shown only 3 sine potentiometers 32, 34, 36 and their associated gear boxes, it will be understood that in practice of this invention there will be a sine potentiometer corresponding to each frequency which is desired to be considered in determining the phase curve. If, for example, the frequencies of interest are from 40 to 60 cycles per second, then there would preferably be a potentiometer for each frequency from 40, 41, 42, . . . to 60, if determinations were desired at intervals of one cycle per second. For this example, the output of potentiometer 32 would be $\sin w_1 t$ and $\cos w_1 t$, where $w_1$ would be equal to $2\pi$ times 40. Gear boxes 22, 24 and 26 are of a character to obtain the desired sine wave output. The output of sine potentiometer 34 is $\sin w_2 t$ and $\cos w_2 t$ and the output of potentiometer 36 is $\sin w_n t$ and $\cos w_n t$. In this example $w_2$ is $2\pi$ times 41 etc.

Also illustrated in FIG. 2 are a plurality of multiplier tubes 42, 44, 46, 48, 50 and 52. The $\sin w_1 t$ signal from potentiometer 32 is fed through lead 54 to the control grid of multiplier 42. The $\cos w_1 t$ signal from potentiometer 32 is fed through lead 56 to the control grid of multiplier tube 44. The $\sin w_2 t$ signal and the $\cos w_2 t$ signal from potentiometer 34 are fed respectively through leads 58 and 60 to the control grids of tubes 46 and 48 respectively. Likewise, the $\sin w_n t$ signal and the $\cos w_n t$ signal from potentiometer 36 are fed respectively through leads 62 and 64 to the control grids of multiplier tubes 50 and 52 respectively.

Attention will now be directed to that part of the apparatus of FIG. 2 for obtaining an electrical signal representative of the individual segments (such as A′ of FIG. 1) of a seismic signal which is to be analyzed. The seismic signal 66 is indicated as being a variable area seismogram and is composed of traces 66A through 66n. Means are provided such that record 66 advances stepwise at the beginning of each of the sawteeth of signal 38. This is readily accomplished by feeding the sawtooth signal 38 to a peak detector 68. Peak detector 68 is of a character to have a sharp, spike output for each peak occurring in the sawtooth signal 38. The output of peak detector 68 is fed to a step-wise advancing motor 70 which rotates a preselected amount each time it is pulsed. The motor 70 is used to drive roller 73 so as to advance film 66 in a step-wise manner.

A radio-frequency generator 72 is electrically connected through conduit 74 to the horizontal deflection plate of flying spot scanner 40. This causes the flying spot scanner to generate a line perpendicular to the time axis on the seismogram. This linear element of light is caused to scan the seismic trace along the time axis by the sawtooth deflection signal. The amplitude of the sawtooth waveform determines the duration or segment of the signal being analyzed. The scanning repetition rate is determined by the speed of rotation of motor 18 and gear box 20. This also assures synchronization between the sawtooth voltage and the several sine wave frequency voltages. A photo-multiplier 76, which can be a photoelectric transducer, is arranged to receive the linear beam of light from flying spot scanner 40, that is, that portion of the beam which is not blocked by any darkened area of the segment being analyzed. The output of transducer 76 is a signal $g(t)$. The output signal $g(t)$ from phototransducer 76 is fed through conduit 78 to the screen grid of multiplier tubes 42, 44, 46, 48, 50 and 52.

The signal $g(t)$ for each segment scanned by flying spot scanner 40 is multiplied by $\sin w_1 t$ and $\cos w_1 t$ individually through $\sin w_n t$ and $\cos w_n t$. The outputs of multiplier tubes 42, 44, 46, 48, 50 and 52 are fed respectively to integrators 80, 82, 84, 86, 88 and 90 respectively. Integrators 80 and 82 are connected to phase meter 92; integrators 84 and 86 are connected to phase meter 94; and integrators 88 and 90 are connected to phase meter 96. It is thus seen that in this system $g(t)$ (a signal representing the segment of a seismic trace being analyzed) is multiplied by $\sin wt$ and $\cos wt$ independently. The independent products are integrated and then their phase relationship is determined. This determines one point of the phase-frequency curve of that particular portion of the signal being analyzed. This is repeated for all other frequencies desired and additional points of the phase-frequency curve are obtained. By these points, the phase-frequency curve is readily defined. The output of the integrators should be reduced to zero when a new segment of the trace is to be analyzed. If the integrators are of the resistance-capacitor type, this clearing can be conveniently done by means of a multi-pole relay momentarily operated by the pulse from the peak detector 68. The outputs of phase meters 92, 94 and 96 are fed to a comparator or display 98. The nature of display 98 will be described fully in FIGS. 3 and 4. The nature of print-out or recording means 100 is fully shown in FIGS. 3, 4 and 5.

Figure 3:
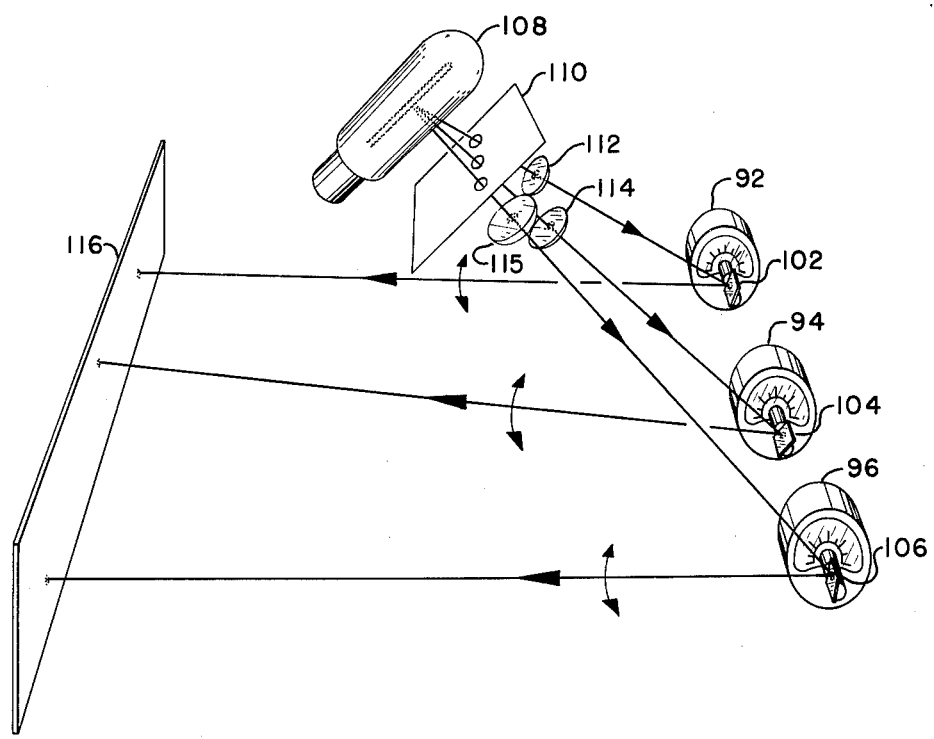
FIG. 3 illustrates a portion of the comparator and display element of FIG. 2.

Turning now to FIG. 3 there is illustrated one form of a display suitable for use as display 98 in FIG. 2. Phase meters 92, 94 and 96 are shown as having mirrors 102, 104 and 106 respectively. These mirrors are such as to be rotated from an at rest position by the phase meter in proportion to the phase angle as determined by the phase meter for the signals fed thereto such as from a pair of integrators 80 and 82.

A light source 108 is directed through shield 110 to lenses 112, 114 and 115. These lenses are arranged and are of a character to direct a beam or point source of light toward mirrors 102, 104 and 106 respectively. A frosted glass plate 116 is arranged to receive reflections of light from mirrors 102, 104 and 106. The drawing of FIG. 3 shows only 3 phase meters; however, in actual practice it is anticipated that there will be many, one for each frequency component of interest. Thus there will be many points of light falling on the frosted glass 116. Thus it will be relatively easy to observe the phase-frequency values in a manner which would constitute a plot of the values.

When the glass in FIG. 3 is observed by an operator to determine when the points of light striking plate 116 are in a zero-slope straight line, it is desired that the step-wise advancing of the increment being analyzed be at a relatively slow pace. In such a case, waveform 38 will be disconnected from peak detector 68 by opening of switch 39. Record section 66 then can be advanced by hand the amount $\Delta T$ when and as desired.

Figure 4:
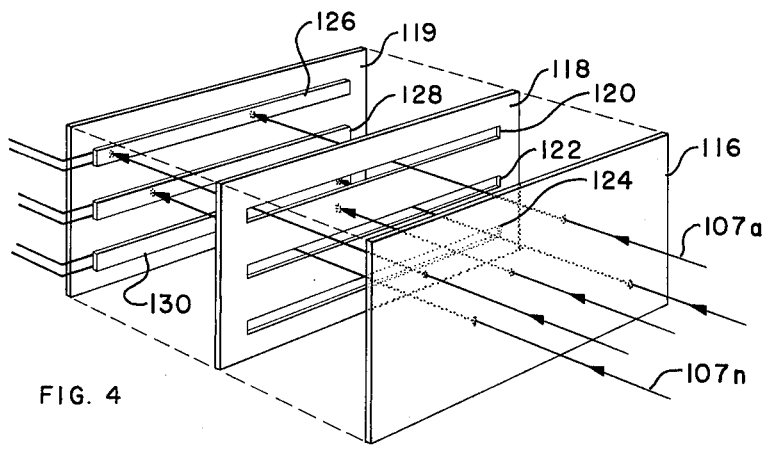
FIG. 4 illustrates another embodiment of the comparator of FIG. 2.

When analyzing a large number of records, it will be desired to analyze the intervals automatically and to record the time when the phase-frequency slope is zero. This is readily accomplished by the additional use of the devices illustrated in FIG. 4 and FIG. 5. FIG. 4 is shown in exploded view and illustrates frosted glass 116, slotted plate 118 and photo-electric plate 119. In practice these three plates can be adjacent to each other, and if desired plate 116 can be removed. It is preferred to leave plate 116 as a part of the device so that if a manual operation is desired for any reason, then all that is necessary to do is to remove plates 118 and 119. Plate 118 has three horizontal slots thereon. The upper slot 120 is aligned with $\pi$ on the phase axis, slot 122 aligned with zero phase axis, and slot 124 aligned with $-\pi$ on the phase axis. Mounted on plate 119 are elongated photo-sensitive transducers 126, 128 and 130 which are respectively aligned to receive light passing through slots 120, 122 and 124 of plate 118.

Figure 5:
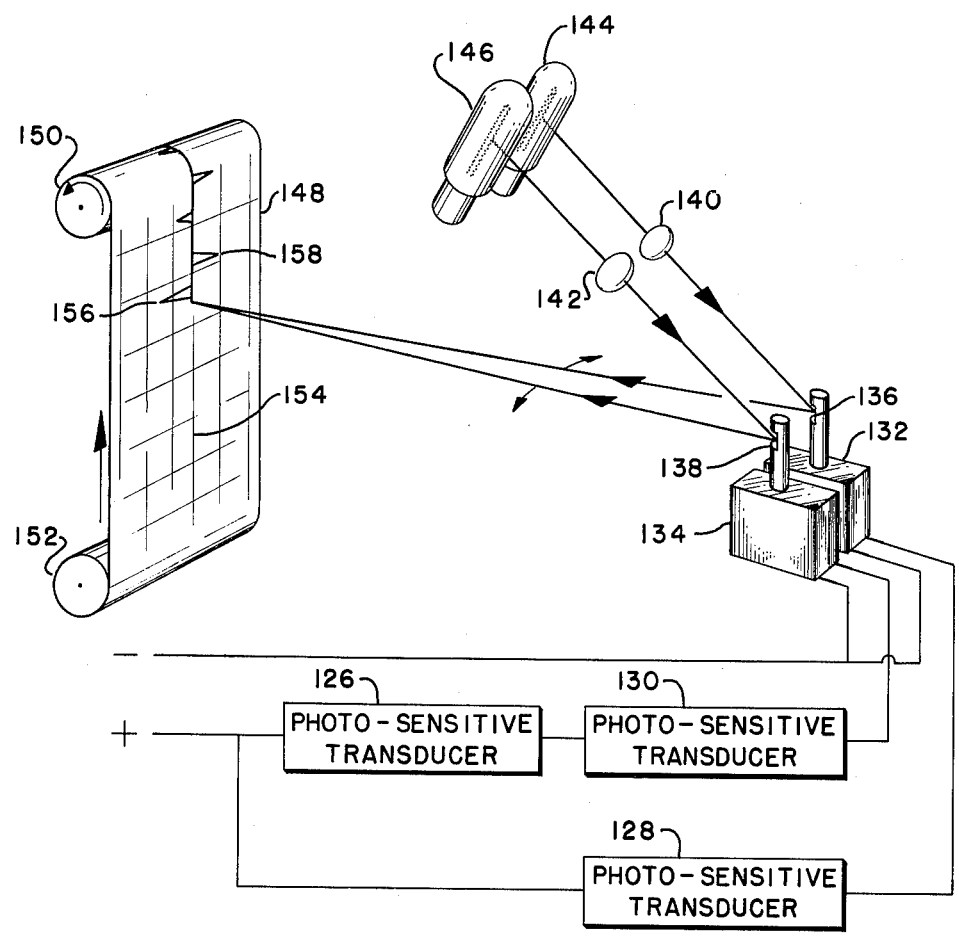
FIG. 5 illustrates one form of the recording element of FIG. 2.

Shown in FIG. 5 are mirror galvanometers 132 and 134 having rotating mirrors 136 and 138 respectively. Lenses 140 and 142 are positioned to receive light from light sources 144 and 146 respectively and to direct a beam of light onto mirror galvanometers 136 and 138 respectively. A photo-sensitive recording medium 148 is positioned between an upper motor-driven roller 150 and a lower holding roller 152. Roller 150 is driven by well known motor means. Recording medium 148 is positioned to receive light on a zero reference line 154 when mirrors 136 and 138 are in their at rest position.

Photo-sensitive transducers 126 and 130 are connected in series and the output is used to control galvanometer 134. These transducers are of a character and connected in such a manner that when a preselected number of light beams 107a to 107n simultaneously strike photo-sensitive transducers 126 and 130 that the transducers are rendered conductive and cause galvanometer 134 to rotate from its at rest position, for example in a manner to form a sharp spike 156 to the left of the zero reference line 154, indicating a negative wavelet sense or polarity. Photo-sensitive transducer 128 is electrically connected to galvanometer 132. When a preselected number of light beams 107 to 107n fall upon photo-sensitive transducer 128, mirror 136 is rotated from its at rest position, preferably in a counter-rotational direction from that of mirror 138, indicating a positive wavelet sense or polarity. Thus when photo-sensitive transducer 128 is rendered conductive, the spikes to the right of reference line 154 are formed, such as spike 158. Of course, if desired, the spikes can all be on the same side of the reference line.

The device described above in regard to FIGS. 2, 3, 4 and 5 pertained essentially to a one-channel device. It is apparent that a multi-channel version can be prepared using a duplication of a number of the components. It is further seen that the device of FIG. 2 is primarily a frequency component analyzer, it computes both sine and cosine components for frequencies $f_1, f_2 \ldots f_n$. Each sine and cosine component is multiplied by a signal $g(t)$ for an interval $\Delta T$ of an electrically reproducible seismic trace. The interval may be of the order of 40 to 50 milliseconds for the conventional reflection seismogram. After multiplication of the cosine and sine components for each frequency by the $g(t)$ for the interval, the product of $g(t)$ times the cosine component is phase compared with the product of $g(t)$ times the sine component for the same frequency. This is repeated for each frequency component across the desired band width. This phase comparison then is used to determine when the phase-frequency slope is zero. When the zero slope occurs, the interval being scanned contains the reflection wavelet and is centered over the event. Accordingly, an indication of the time of this occurrence is recorded on the record.

If desired, the slots in plate 118 can be arranged such as to have allowance for phase variation with the frequency in the recording and playback system. This could be done basically by altering the shape and position of the slots in plate 118. The foregoing description has been based on the premise that the event being analyzed gives a phase-frequency curve which has a zero-frequency phase intercept for a positive polarity and a plus or minus 180 degree phase intercept for a negative polarity. The slots 120, 122 and 124, can be moved up or down to accommodate other zero-frequency phase intercept angles. Also, the slots 120, 122 and 124 may be curved, instead of linear, so as to accommodate known phase shift effects in the geophone, recording, or playback systems.

It will be understood that the apparatus and system contained in the above description are merely representative or illustrative and are not limited and that numerous modifications may be made thereon without departing from the scope of the invention.

What is claimed is:

1. A system for recording phase information of a seismic signal which comprises: a first plate having three essentially parallel slits therein; a second plate spaced from said first plate; a middle and two side elongated photosensitive transducers supported by said second plate and aligned with the slits of said first plate; a first mirror galvanometer; a second mirror galvanometer; means connecting said middle photosensitive transducer to said first galvanometer and to cause it to rotate in one direction; means connecting the two side photosensitive transducers to said second mirror galvanometer such that upon energization of said two side photosensitive transducers that the mirror of said second galvanometer is rotated in the opposite direction from that of said first galvanometer; means to direct light to said mirror galvanometers and means to record the reflection from said mirror galvanometers.

2. An apparatus for displaying frequency phase information of a seismic signal in which there are a plurality of phase meters each measuring the phase of a different frequency the improvement which comprises: a mirror for each phase meter; means connecting each mirror to its phase meter so that it is rotatively responsive to the phase meter; means to direct a beam of light onto each mirror, plate means arranged to receive light reflected from said mirrors, said mirrors being arranged to direct their beams of light parallel for similar phase readings.

3. An apparatus for recording frequency phase information of a seismic signal in which there are a plurality of phase meters, each measuring the phase of a different frequency, the improvement which comprises: a mirror for each phase meter; means connecting each mirror to its phase meter so that it is rotatively responsive to the phase meter; a first plate having three slits therein; a second plate spaced from said first plate; a first, a second and a third elongated photosensitive transducer supported by said second plate, such transducers being of approximately the same shape as and aligned with the slits of said first plate, the said second elongated photosensitive transducer being between said first and said third transducers; means to direct a beam of light onto each mirror, said mirrors and said first plate and said second plate being arranged so that light is reflected from said mirror toward said first plate and when passing through said slits strikes said photosensitive transducers; a first mirror galvanometer; a second mirror galvanometer; means connecting said second photosensitive transducer to said first galvanometer such that upon energization of said second photosensitive transducer said first galvanometer is rotated in one direction; means connecting the first and third photosensitive transducers to said second mirror galvanometer such that upon energization of such transducers said second galvanometer is rotated in the opposite direction from that of said first galvanometer; means to direct a beam of light to each of the mirrors of said galvanometers, and means to record the reflections from said mirror galvanometers.

4. An apparatus for recording frequency phase information of a seismic signal in which there are a plurality of phase meters, each measuring the phase of a different frequency, the improvement which comprises: a mirror for each phase meter and rotatively responsive thereto; a plurality of photosensitive transducers; means to support said transducers in essentially parallel relationship; means to direct a beam of light onto each mirror; means to record an indication on a recording medium upon light from a selected number of the mirrors of the phase meters striking one of said photosensitive transducers; and means to record a second indication upon light from a selected number of the mirrors of said phase meters striking the other two photosensitive transducers.

References Cited by the Examiner

UNITED STATES PATENTS

| | | | |
|---|---|---|---|
| 1,843,572 | 2/1932 | MacGahan | 346—1 |
| 2,604,955 | 7/1952 | Hawkins | 181—.5 |
| 2,658,189 | 11/1953 | Lovell. | |
| 2,769,683 | 11/1956 | Skelton | 346—109 |
| 2,871,088 | 1/1959 | Abell | 346—1 |
| 2,875,017 | 2/1959 | Reynolds | 346—109 |
| 2,937,915 | 5/1960 | Peterson | 346—109 |
| 2,951,736 | 9/1960 | Black | 346—1 |
| 3,039,101 | 6/1962 | Perdue | 346—1 |
| 3,045,180 | 7/1962 | Losher | 324—77 |
| 3,050,731 | 8/1962 | Usdin | 346—1 |
| 3,066,300 | 11/1962 | Widess | 346—109 |
| 3,123,799 | 3/1964 | Shook | 340—15.5 |

LEYLAND M. MARTIN, *Primary Examiner.*

M. A. MORRISON, *Examiner.*